United States Patent [19]
Papsdorf

[11] 3,915,040
[45] Oct. 28, 1975

[54] PUNCHED TAPE CONTROL SYSTEM

[75] Inventor: John W. Papsdorf, Lake Orion, Mich.

[73] Assignee: Cardinal of Adrian, Inc., Dryden, Mich.

[22] Filed: June 10, 1974

[21] Appl. No.: 477,753

[52] U.S. Cl. .......... 83/13; 83/71; 250/570
[51] Int. Cl.$^2$ .......... B26D 5/30
[58] Field of Search .......... 83/13, 71; 353/25–27; 250/557, 570

[56] References Cited

UNITED STATES PATENTS

| | | | |
|---|---|---|---|
| 3,046,407 | 7/1962 | Hoffman | 250/570 |
| 3,222,501 | 12/1965 | Wood | 250/557 X |
| 3,291,994 | 12/1966 | Romeo et al. | 250/557 |
| 3,618,788 | 11/1971 | Murray | 83/71 X |
| 3,618,789 | 11/1971 | Young | 83/71 X |

*Primary Examiner*—Frank T. Yost
*Attorney, Agent, or Firm*—Cullen, Settle, Sloman & Cantor

[57] ABSTRACT

In an apparatus for performing various operations on stock material, such as advancing, feeding, measuring, cutting and the like, all under the control of a program on a punched tape, an improved punched tape control system wherein the sprocket holes, which are utilized for advancing the punched tape, are also utilized to convey control information. Data is placed on the tape in the form of perforations on parallel longitudinal tracks or channels and the conventional tape advancing sprocket holes also carry data to both control the advancing of the stock material and to synchronize the advancing of the stock material and the advancing of the punched tape. Stock material is advanced only when a sprocket hole is present in the tape and the tape is advanced only when the stock material is operated on in accordance with the data on the tape.

6 Claims, 5 Drawing Figures

PUNCHED TAPE CONTROL SYSTEM

BACKGROUND OF THE INVENTION

This invention relates generally to a punched tape system for controlling the operation of a machine. Basically, punched tapes control systems operate through the use of a closed loop punched or perforated tape which contains appropriately spaced perforations to convey information to control the various operations of the machine.

Punched tape of the type utilized to control the operation of machines typically has a plurality of parallel tracks or channels. One of these tracks or channels contains a plurality of sprocket holes which are engaged by a drive sprocket. The rotation of the drive sprocket sequentially engages the sprocket holes to advance the tape through a tape reading station. The tape contains perforations in the various channels to convey information which is sensed or read by the tape reader and the particular location of these data holes is converted by suitable circuitry to control the operation of the machine.

One problem with the prior systems is that the sprocket holes do not convey any information. This reduces the number of available channels or tracks on the tape.

A second problem can be best undertsood by considering the type of information contained on the tape. If it is desired to have the machine advance stock material, under the prior systems it was often necessary to place a perforation in a particular track (or a series of perforations in a straight line transverse to the longitudinal axis of the tape) to start the advancing operation. Then, when it was desired to terminate the advancing operation another perforation or series of perforations in a different track was necessary.

The alternate way of accomplishing the same result, according to the prior art, was to provide a sequence or series of perforations in a particular track to indicate the continuation of a given machine operation. Thus a series of five consecutive perforations in a particular track or channel were utilized to indicate that the feeding operation was to continue for the length of time it took the tape to be advanced by the drive sprocket the equivalent of five sprocket holes.

None of the prior art systems for punched tape machine controls therefore, made optimum use of the available space on the tape. None of the prior art systems made optimum use of the sprocket holes.

SUMMARY OF THE INVENTION

Thus the invention herein relates to a system for utilizing the sprocket holes to convey information and thus reduce the amount of apertures which must be punched to convey other information and furthermore make more tracks available for additional types of machine control information.

More specifically, the present invention includes the use of a punched tape to control the operation of a machine which performs various functions on stock material such as advancing, cutting and the like all under the control of a program on a punched tape, wherein the conventional sprocket holes on the tape are not only used for advancing the tape itself, but also provide the instructions for advancing the stock material. Furthermore the present invention synchronizes the advancing of the tape with the advancing of the material through use of the sprocket holes. The material is advanced only when a sprocket hole is present on the tape and the tape is advanced to the next sprocket hole only when the material has been operated on in accordance with the data on the tape.

The apparatus includes a tape reader having a drive sprocket for incrementally advancing the tape by sequentially engaging the sprocket holes in the tape. The tape reader senses the presence or absence of perforations in the various tracks and the stock material is advanced a predetermined distance each time a sprocket hole is present. The advance of the stock material rotates an idler which in turn closes the contacts of a normally open switch. Each time the normally open switch is closed, the tape reader is enabled so that the drive sprocket advances the tape to the next sprocket hole.

BRIEF DESCRIPTION OF THE DRAWINGS

The various objects, advantages and features of the present invention will become readily apparent upon reading the detailed description taken in conjunction with the drawings.

In the drawings, wherein like reference numerals identify corresponding parts.

DETAILED DESCRIPTION OF THE INVENTION

The present invention has a preferred utility as a control program for a wire stripping machine such as the type disclosed in my copending application entitled "WIRE STRIPPING METHOD AND APPARATUS", Ser. No. 453,787 Filed Mar. 22, 1974 and assigned to the same assignee as the present invention. Therefore, reference will be made to the machine described in said copending application and the disclosure thereof is hereby incorporated by reference.

Figures 1, 2:
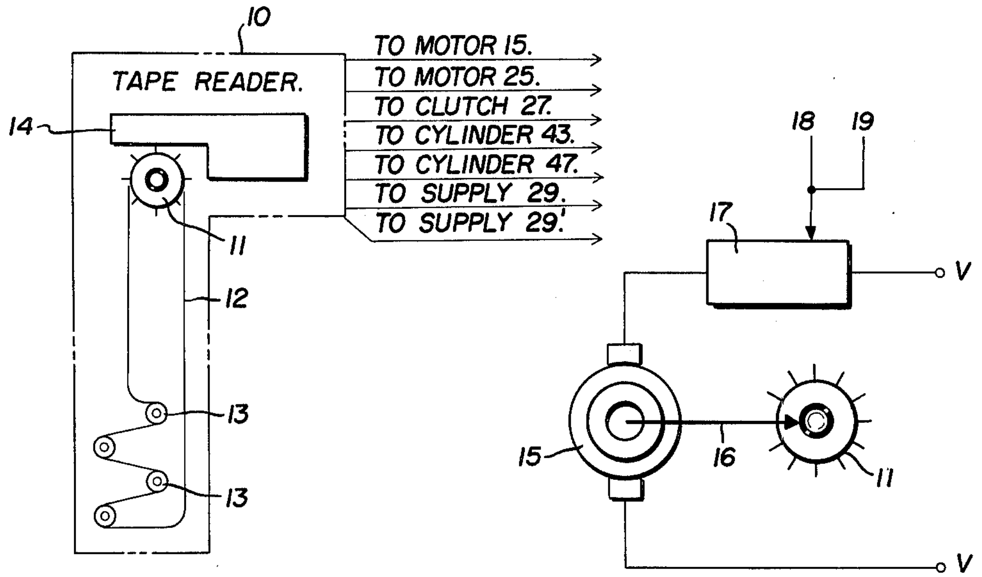
FIG. 1 is a diagrammatic illustration of a tape reader, tape and drive sprocket.
FIG. 2 is a schematic illustration of the motor and control for driving the drive sprocket to advance the tape.

With reference to FIG. 1 a conventional tape reader 10 is illustrated along with a drive sprocket 11 for advancing a perforated tape 12 as is conventional. A preferred tape reader is that manufactured by International Teleprinter Corporation of New Jersey. The tape 12 is a continuous loop which may be wound around a series of rollers 13 to prevent the tape from becoming tangled.

A sensing head 14, which is a part of the tape reader, is positioned over the drive sprocket 11 to sense the presence or absence of perforations in the tape. This sensing may be optical, electrical or mechanical as is conventional.

The drive sprocket 11 is advanced by a tape motor 15 the output of which is coupled through shaft 16 to the drive sprocket. A stepping solenoid 17 which is stepped by pulses from any one of a plurality of sources 18, 19, couples the voltage or power to the motor 15 for intermittent or stepping operation of the tape reader.

Figure 3:
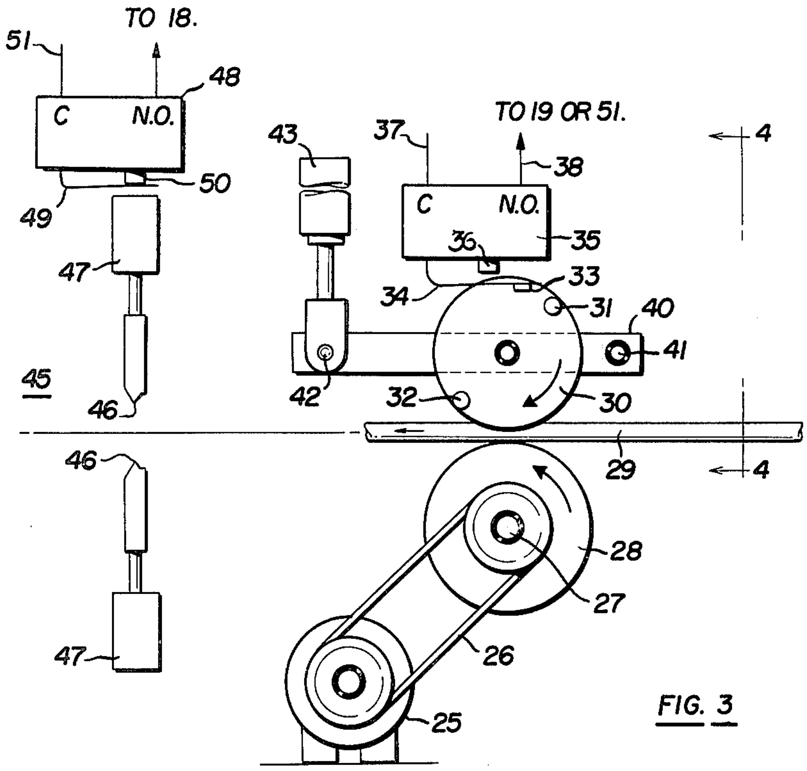
FIG. 3 is an illustration of the apparatus which is controlled by the tape, including means for advancing stock material and means for cutting stock material.
Figure 4:
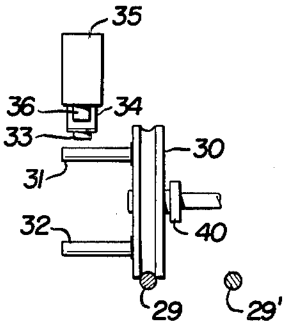
FIG. 4 is a partial illustration of the apparatus of FIG. 3 as seen in the plane of arrows 4–4.

FIGS. 3 and 4 illustrate portions of a wire feeding and stripping apparatus generally in accordance with the principles set forth in my copending patent application referred to above. The apparatus generally includes a motor 25 coupled by a belt or cable 26 to the clutch 27 of a drive wheel 28. The drive wheel is utilized to advance wire or cable 29 in the direction of the arrows as shown.

On the opposite side of the cable or wire 29 from the driver 28 is an idler wheel 30 having two outwardly projecting pins 31,32 spaced 180° apart. As the cable is advanced, the pins 31 and 32 press against a roller 33 on the feeler arm 34 of a limit switch or microswitch 35. The microswitch is a normally open switch and the contact 36 on the switch is closed each time a pin 31,32 contacts the roller on the feeler arm and presses the feeler arm upwardly toward the main body of the switch. The switch 35 has a common lead or input 37 which receives a source of voltage and an output lead 38. A pulse appears on the output lead 38 each time the normally open switch is closed by the feeler arm 34 pressing against the contact 36.

The idler 30 is mounted on a lever 40; one end of the lever 40 is pin connected as at 41 to the apparatus and the second end 42 of the lever 40 is connected to a piston 43. Activation of the piston pivots the lever to raise the idler out of engagement with the cable 29 or lower the idler into engagement with the cable as explained in my copending application.

A second operation performed by the apparatus of my copending application is to cut the cable into predetermined measured lengths. This is accomplished at a cutting station 45 including a pair of opposed cutting blades 46 each activated by a cylinder 47. The cylinder movement also serves to actuate a second limit switch 48. Limit switch 48 is a normally open limit switch with a feeler arm 49 and a contact 50. The positioning of the limit switch is such that when the cylinder is in its upward position the feeler arm is pressed against the contact and the limit switch is closed. It is only upon actuation of the cylinder as part of the cutting operation that the cylinder moves clear of the feeler arm and the switch is opened.

In a preferred embodiment, the normally open contact or lead of the limit switch 35 is connected to the common lead 51 of switch 48. Thus the two limit switches are in series. When the piston at the cutting station is in a retracted or upward position as illustrated in the Figure, the limit switch 48 operates as a closed circuit and the signal occassioned by the closing of the limit switch 35 is passed directly through the limit switch 48 to the stepping solenoid 17 of the drive sprocket. Thus functionally, when the piston at the cutting station is in its retracted position, the limit switch is effectively bypassed. It is only when the piston is energized to perform a cutting operation that the limit switch 48 opens and provides an open circuit to prevent the signal from limit switch 35 from being passed through to the stepping solenoid 17.

Figure 5:
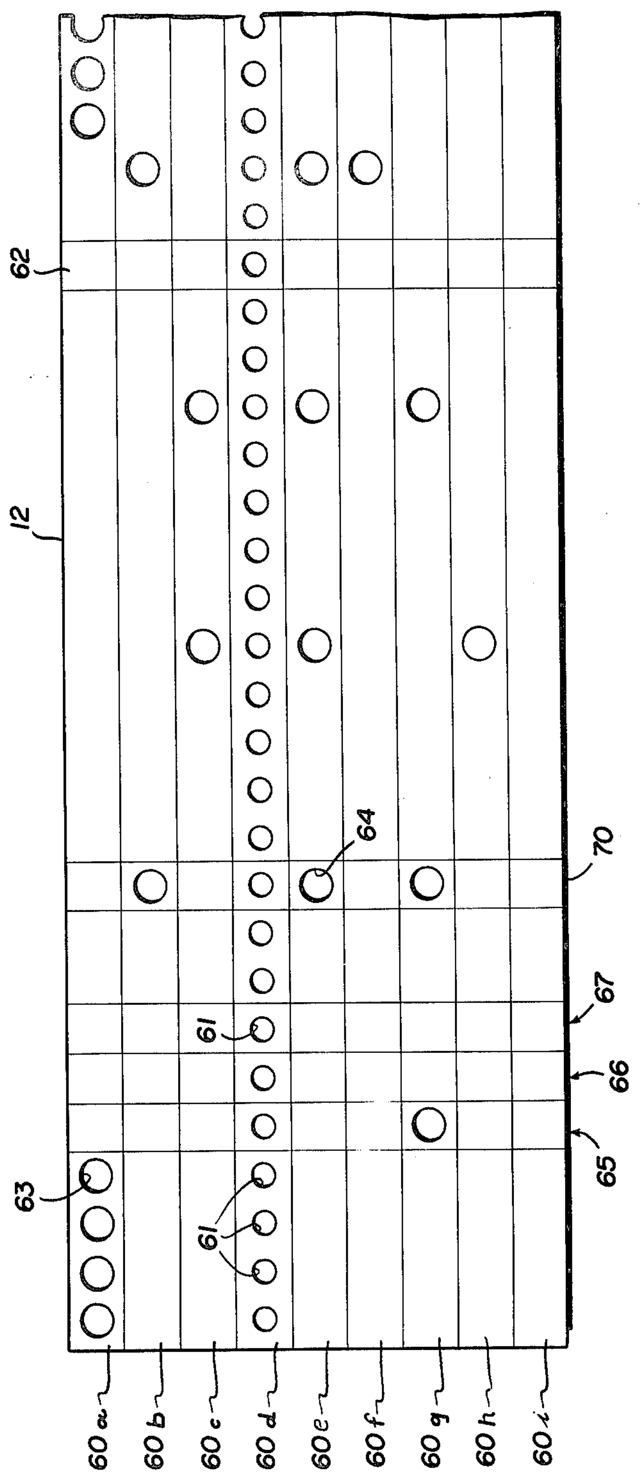
FIG. 5 is an illustration of a section of punched tape incorporating the various principles of the present invention.

FIG. 5 illustrates a section of the perforated tape 12 of the present invention. The tape has a plurality longitudinal channels or tracks **60*a*–60*i*. One of the tracks, 60*d* is denominated the sprocket track and has a continuous series of sprocket holes or perforations 61. These sprockets holes are engaged by the drive sprocket 11 as is conventional to advance the program tape 12.**

Data is contained on the tape 12 in a series of data bits. Each bit is defined as a transverse section of the tape which includes one but only one sprocket hole as shown, for example, by the reference numeral 62.

Each of the channels or tracks 60 within the sprocket track provides a different instruction to the apparatus of my copending application. For example, track **60*a* is denominated tape fast feed and a perforation 63 in track 60*a* indicates that the program tape should be advanced without the machine performing any additional functions. Track 60*e* is called the cut track and a perforation 64 in track 60*e* indicates that the cutting operation at station 45** should commence after the stock material has been advanced.

A perforation in track **60*b* indicates that at a conclusion of both material advance and the cutting operation, the program tape should be automatically advanced by the drive sprocket. A perforation in track 60*c* indicates that the program tape should not be advanced after a cutting operation until the section of wire which has been cut is manually removed from the apparatus. Tracks 60*g* and 60*h* are utilized to indicate which one of several supplies of stock material 29,29′ should be advanced, since the present machine as set forth in my copending application can utilize cable from more than one source. Finally, track 60*f* is utilized to indicate that the program on the tape 12** has been completed and the apparatus is stopped.

It should further be pointed out at this point that as set forth in my copending application, the entire tape program can be bypassed and the operation of the machine can be purely manual. In such a case there is a button to be manually activated for each function of the machine.

OPERATION

In order to better understand the principles of the present invention, the operation of the program control will be explained in the context of advancing or feeding and cutting into various predetermined lengths the wire or cable 29. The idler 30 has a circumference of 1 foot. Thus one revolution of the idler 30 corresponds to 1 foot of cable 29 being advanced. Obviously since there are two pins 31, 32 on the idler, one rotation of the idler corresponds to two pulses to the limit switch 35. Hence the limit switch is pulsed once for every 6 inches that the cable is fed or advanced.

Supposing it is desired to cut a four foot of length of wire according to a predetermined program on the tape 12. At a start position, such as the data bit 65, when the machine has been turned to a power on and program on status, the perforation in track **60*g* indicates the particular coil or supply of cable 29,29′ to be advanced. This also starts the initial advance of the cable. When the cable has been advanced 6 inches, the idler 30 has been rotated one half revolution and one of the pins pulses the limit switch 35. This transmits a signal through the closed limit switch 48 to the stepping solenoid 17. The stepping solenoid is actuated and the drive sprocket 11 advances programed tape one data bit to the data bit 66.**

There are no perforations in any of the tracks except the sprocket track at data bit 66. Hence the advance of the cable 29 continues for another 6 inches. Then the next pin on the idler 30 pulses the limit switch 35 which is transmitted to limit switch 48 to the stepping solenoid 17. This permits the drive sprocket to advance the programed tape one more data bit to bit 67.

Thus the sequence of operations so far is that the cable is advanced six inches for each sprocket hole. The completion of the 6 inch advance of the cable, which is the equivalent of the carrying out of the instruction of the tape, rotates an idler which pulses a limit switch to activate a stepping solenoid. This permits the tape to be advanced to the next data bit. Advancing the tape to the next data bit and the presence of no perforations in any of the tracks other than the sprocket track results in the tape again being advanced another six inches. Hence there is a two-way synchronization and inter-dependency. The cable is not advanced unless there is a presence of at least a sprocket hole. The tape is not advanced to the next data bit until the instruction on the prior data bit has been completed.

The next operation which will be explained is shown in data bit 70 as a cutting operation (track 60*e*). It is noted that there is a sprocket track hole in track 60*d* in data bit 70. Hence the cable 29 is advanced another 6 inches in accordance with the sprocket hole instruction in data bit 70. However, the sensing of the perforation in track 60e starts the operation at the cutting station at the same time. The piston or cylinder 47 is actuated thereby removing the feeler arm 49 from contact with the limit switch 48. This opens the circuit and the pulsing from limit switch 35 though limit switch 48 is blocked. Thus the conclusion of the cable advance does not pulse the stepping solenoid 17.

The physical movement of the cylinder of the cutting station 45 continues until the cutting blade cuts the cable. Then the cylinders are retracted closing the feeler arm 49 onto the contact 50 of the limit switch 48. This ends a pulse to the terminal 18 of the stepping solenoid and the drive sprocket is stepped one more sprocket hole or data bit.

Thus the presence of a perforation in a track other than the sprocket track can be seen to require not only the advancing of the cable (based upon the sprocket holes) but also the carrying out of yet another step based upon the particular location of the perforation in the data bit.

As a precaution, the limit switch 35 is wired through the limit switch 48 to the stepping solenoid. However, this type of wiring arrangement is not required because of the manner in which the idler 30 is mounted to the machine. Upon the receipt of a signal such as the cut signal from track 60*e*, the cylinder 43 is activated to raise the idler out of contact with the cable. This movement prevents the pins 31,32 from closing the microswitch 35. Hence no signal from the normally open microswitch 35 will be transmitted to the stepping solenoid 17. After the signal to the stepping solenoid is presented from another source such as the limit switch 48, the advance of the drive sprocket is also electrically coupled to lower the cylinder 43.

The foregoing is a description of a preferred embodiment of the present invention. The principles upon which this invention are based include the use of the sprocket holes to convey information as to the length stock to be advanced and the synchronization between the advance of the programmed tape and the advance of the stock material. While specific hardware according to a preferred embodiment has been shown for implementation of these novel principles, it should be apparent to those skilled in the art that many modifications can be made without departing from the spirit and scope of this invention. Therefore, the invention should be limited only by the scope of the following claims.

What is claimed is:

1. Apparatus for advancing, feeding, measuring and cutting to length stock in response to a program on a tape, said tape having a plurality of parallel longitudinal tracks, one of said tracks having sprocket holes for advancing said tape, said tape including a plurality of data bits, each bit being defined as a transverse portion of the tape having a length sufficient to include only one sprocket hole, the improvement comprising:

a tape reader including an incrementally advancing drive sprocket for engaging the sprocket holes and incrementally advancing the tape one data bit at a time, said tape reader including means to sense the presence or absence of perforations in each track and provide an output in response thereto;

means for advancing said stock a predetermined distance in response to the presence of a sprocket hole;

means responsive to said tape reader output for cutting the advanced stock based upon the presence and relative location of a non-sprocket perforation in a data bit, and means activated by the advancing of said stock said predetermined distance for enabling said drive sprocket to advance said tape another data bit;

whereby the number of consecutive data bits having only a sprocket hole in proportional to the length of stock to be advanced by the apparatus.

2. The invention as defined in claim 1 and further including:

means responsive to said tape reader output for bypassing said enabling means and for advancing said drive sprocket one increment after the cutting of said stock based on the presence and relative location of a non-sprocket perforation in said data bit.

3. The invention as defined in claim 1 and further including means responsive to said tape reader output for bypassing said enabling means and for advancing said drive sprocket one increment after the cutting of said stock and after the removal of said cut stock from the apparatus based on the presence and relative location of a non-sprocket perforation in said data bit.

4. A method for advancing, feeding, measuring and cutting to length stock in response to a program on a tape, said tape having a plurality of parallel longitudinal tracks, one of said tracks having sprocket holes for advancing said tape, said tape including a plurality of data bits, each bit being defined as the tracks in a transverse portion of the tape having a length sufficient to include only one sprocket hole, the improvement comprising:

incrementally advancing the tape one data bit at a time by rotating a drive sprocket;

sensing the presence or absence of perforations in each track and providing an output in response thereto;

advancing said stock a predetermined distance in response to the presence of a sprocket hole;

cutting the advance stock based upon the presence and relative location of a non-sprocket perforation in a data bit, and rotating said drive sprocket to advance said tape another data bit when said stock has been advanced said predetermined distance;

whereby the number of consecutive data bits having a sprocket hole but no other perforations is proportional to the length of stock advanced.

5. The invention as defined in claim 4 and further including:

advancing said drive sprocket one increment after the cutting of said stock based on the presence and relative location of a non-sprocket perforation in said data bit.

6. The invention as defined in claim 4 and further including:

advancing said drive sprocket one increment after the cutting of said stock and after the removal of said cut stock from the apparatus based on the presence and relative location of a non-sprocket perforation in said data bit.

* * * * *